United States Patent [19]

van Baardwijk et al.

[11] Patent Number: 4,796,254
[45] Date of Patent: Jan. 3, 1989

[54] BROADBAND SPACE SWITCHING NETWORK AND PARALLEL-SERIES CONVERTER AND SERIES-PARALLEL CONVERTER FOR USE IN SUCH A SPACE SWITCHING NETWORK

[75] Inventors: Johannes van Baardwijk; Dick van der Steen, both of Eindhoven, Netherlands

[73] Assignee: AT&T Philips Telecommunications B.V., Hilversum, Netherlands

[21] Appl. No.: 21,319

[22] Filed: Mar. 3, 1987

[30] Foreign Application Priority Data

Mar. 10, 1986 [NL] Netherlands .......................... 8600613

[51] Int. Cl.$^4$ .............................................. H04J 3/02
[52] U.S. Cl. ........................................ 370/58; 370/60; 370/59; 340/825.79
[58] Field of Search ................ 370/54, 59, 58, 64, 370/63, 67, 42; 379/296, 306; 340/825.5, 825.79

[56] References Cited

U.S. PATENT DOCUMENTS

| | | | |
|---|---|---|---|
| 4,074,077 | 2/1978 | Charransol et al. | 370/58 |
| 4,392,221 | 7/1983 | Hesketh | 370/58 |
| 4,406,005 | 9/1983 | Simmons et al. | 370/58 |
| 4,446,552 | 5/1984 | Tweedy | 370/58 |
| 4,495,615 | 1/1985 | Wilcke | 370/58 |
| 4,534,023 | 8/1985 | Peck et al. | 370/58 |
| 4,616,360 | 10/1986 | Lewis | 370/67 |
| 4,635,250 | 1/1987 | Georgiou | 370/58 |
| 4,639,910 | 1/1987 | Toegel et al. | 370/67 |
| 4,695,999 | 9/1987 | Lebizay | 370/58 |

*Primary Examiner*—M. H. Paschall
*Attorney, Agent, or Firm*—Lucian C. Canepa

[57] ABSTRACT

The invention relates to a broadband space switching network and to a parallel-series converter and to a series-parallel converter in combination with such a space switching network. The crosspoints of the space switching network are set once per n-bit word. So as to find the time required therefor, each word contains $(n-n_1)$ "idle" bits, $n_1$ representing the number of information bits. During the time in which the "idle" bits are transmitted, the space switching network is switched to the desired new state. The parallel-series converter, which is also required for other reasons, is used to inject "idle" bits into the bit stream conveyed to the space switching stage. The "idle" bits are removed again by means of a series-parallel converter at the output of the space switching stage.

3 Claims, 5 Drawing Sheets

BROADBAND SPACE SWITCHING NETWORK AND PARALLEL-SERIES CONVERTER AND SERIES-PARALLEL CONVERTER FOR USE IN SUCH A SPACE SWITCHING NETWORK

The inventoin relates to a broadband space switching network comprising a plurality of input lines, a plurality of output lines intersecting the input lines and a plurality of cross-point switches provided on each intersection of an input line and an output line, the switches having a control input coupled to a cross-point control for selectively through-connecting an input line to an output line.

The invention further relates to a parallel-series converter for use with a broadband space switching network, and also to a series-parallel converter for use with a broadband space switching network.

For ISDN-Networks a switching system is required which has a comparatively large capacity and switching rate. For broadband ISDN-Networks also broadcast-TV signals are switched through the network, that is to say signals having a bandwidth from 35 to 70 Mbit/s. Consequently, the switching rate of the switching system must satisfy still higher requirements. The dimensioning of the switching system and its structure depends inter alia on the number of subscribers or terminals to be connected to the switching system. For smaller-capacity exchanges it is sufficient to use one or a plurality of time switching stages, whereas for the larger exchanges a switching system of the time-space-time (or TST) type or even TSSST type may be required.

The invention has for its object to provide a space switching network suitable for switching broadband channels at high rates. The invention provides a broadband space switching network as set forth in the opening paragraph characterized in that the bit stream on the input lines and the output lines is organized in n-bit words, that each word contains $n_1$ ($n_1 < n$) information bits and ($n - n_1$) idle bits, that the cross-point switches always switch through a $n_1$ information bit word from an input line to an input line and that the cross-point switches are adjusted to the desired position by the crosspoint control in (a portion of) the period in which the ($n - n_1$) idle bits are present on the input line.

By creating "hole" in the very high rate bit stream, a time interval is created to the control network for readjusting the switches in the space switching network.

The invention has for its further object to provide a parallel-series converter for use in a braodband space switching network by means of which the input signal for the space switching network can be adjusted to a more appropriate shape. According to the invention, the parallel-series converter is characterized in that the parallel-series converter comprises a first register and a second register, each have n sections, and a plurality of change-over switches, that an input of each switch is connected to an input of the parallel-series converter, that a first change-over contact of each switch is connected to an input of $n_1$ sections of the first register and that a second change-over contact of each switch is connected to an input of $n_1$ sections of the second register for alternately writing the first and second registers, that an output of the first register is connected to a first change-over contact of an output switch and an output of the second register is connected to a second change-over contact of the output switch and that a control input of the two registers is coupled to a clock generator for alternately, serially reading the contents of the n sections of the second and first registers.

The invention has for its further object to provide a series-parallel converter by means of which "idle" bits are removed from the output signal of the space switching network. According to the invention, the series-parallel converter is characterized in that the series-parallel converter comprises a first register and a second register, each having n sections, and a plurality of change-over switches, that an output of each switch is connected to an output of the series-parallel converter, that a first change-over contact of each switch is connected to an input of the $n_1$ sections of the first register and that a second change-over contact of each switch is connected to an input of n sections of the second register for alternately and, in parallel reading the contents of $n_1$ sections of the first and second registers, that an input of the first register is connected to a first change-over contact of an input switch and that an input of the second register is connected to a second change-over contact of an input switch and that a control input of the two registers is coupled to a clock generator for alternately, serially writing the second and first registers.

An embodiment of the invention and the advantages thereof will now be further described by way of example with reference to the accompanying drawings. Therein.

Figure 1A:
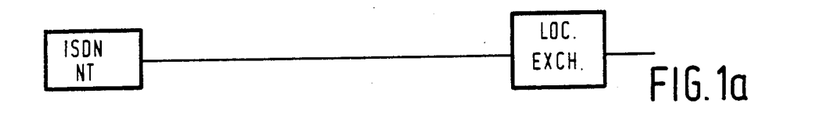
FIGS. 1a–1d shows an illustration of the anticipated evolution from ISDN to IBCN (Integrated Broadband Communication Network) for which last-mentioned network concept the invention provides a switching system.

Digitizing the telephone network opened the possibility of providng a wider range of services to the subscribers. In addition to the transmission of telephone traffic in circuit-switched, 64 kbits/s channels, the possibility of utilizing the network also for data traffic was created. The what is commonly referred to as Integrated Services Digital Network (ISDN) becomes possible. For the transmission between the subscriber's terminal (telephone set/date terminal), more specifically in the terminating circuit ISDN NT, and the "terminal" exchange (LOC.EXCH.), use is made of the existing 2-wire or 4-wire copper connection (FIG. 1A).

Figure 1B:
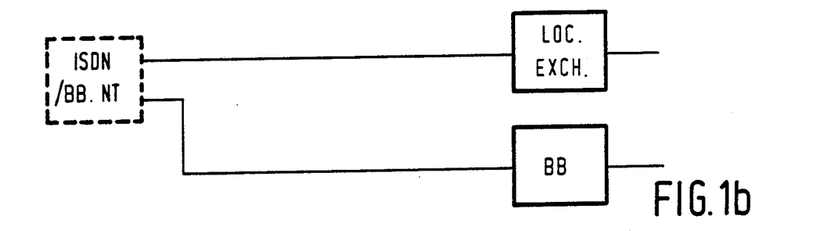
Figure 1C:
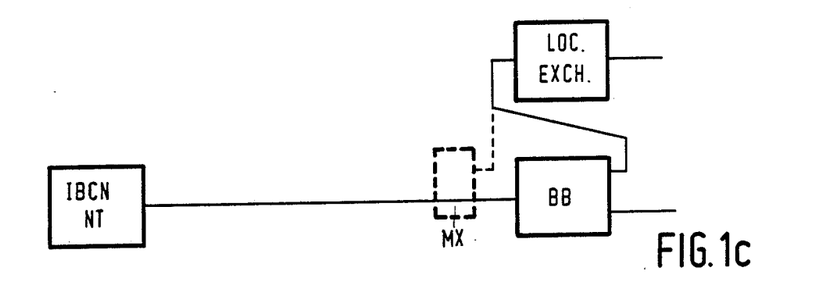
Figure 1D:
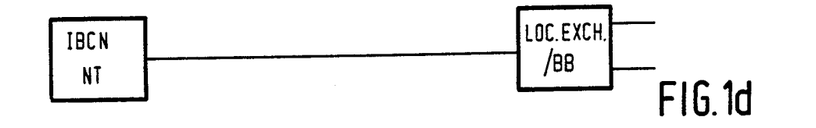

Gradually, the need was felt for channels having a such higher rate than 64 kbits/s : especially the need for 35–70 Mbits/s channels for broadcast-TV and also for 2–8 Mbits/s video channels for, for example, conference television. For the transmission of such broadband signals use can be made of optical fibres. In the first instance, broadband optical fibre networks can be arranged next to the existing copper wire networks, a broadband switching system (BB) being introduced in addition to the conventional switching network (LOC.EXCH.) on 64 kbits/s ("overlay"). At the subscriber's end the network can be terminated with the combined ISDN/broadband terminating circuit ISDN/BB NT (FIG. 1B). In the future, this evolution might result in signals which were up till then still transmitted through the copper wires being conveyed through the optical fibres, as the channel capacity extension on the optical fibre this entails is insignificant as to be disregarded. The two exchanges (LOC.EXCH. and BB) can then be connected to the common optical fibre via a multiplexer MX. It is, however, to be expected that the ISDN (terminal) exchange LOC.EXCH. will be connected in its totality to the input of the broadband switching network BB in addition to the truly broadband TV and video channels to be switched (FIG. 1C). The multiplexer (MX) then becomes superfluous. In the long run, the distinction between the switching system for the ISDN (terminal) exchange and the switching system for the broadband may gradually disappear and an integrated broadband terminal exchange LOC.EXCH/BB would then take its place (FIG. 1D).

In view of this evolution, and more specifically the last phase thereof, it is necessary to develop a broadband switching network which is suitable both for switching the conventional, interactive 64 kbits/s telephone and data channels to be switched, and distributive broadband TV-channels (for example 70 Mbit/s) and interactive, for example 2 or 8 Mbits/s video, music and data channels.

Figure 2:
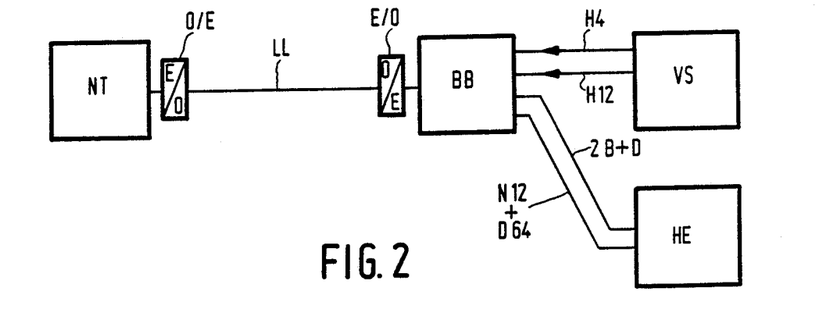
FIG. 2 is a circuit diagram of the telecommunication traffic and the composition of that traffic and an IBCN network according to the invention.

The services which can be performed with the aid of a broadband network and a possible implementation thereof are shown schematically in FIG. 2. Many broadcast TV and video sources VS are connected to the broadband switching system BB. The services appropriate therefor are the standard braodcast-TV, pay-television, video-telephony, video-library, electronic newspaper, etc. The band width of the channel varies between 34 Mbits/s (or 70 Mbits/s) for broadcast-TV (the H4-channels) to 2 Mbits/s for video conferences (H12-channel). In addition, an ISDN exchange HE is connected to the broadband switching system BB. The exchange HE applies, for example, 30B+D64 channels and a number of 2B+D16 channels (30×64 kbits/s+64 kbits/s and 2×64 kbits/s+16 kbits/s, respectively) to the broadband switching system BB. The switched signals are transmitted to the opto-electrical converter O/E of the subscribers terminal NT via an electro-optical converter E/O and an optical fibre LL.

Figure 3:
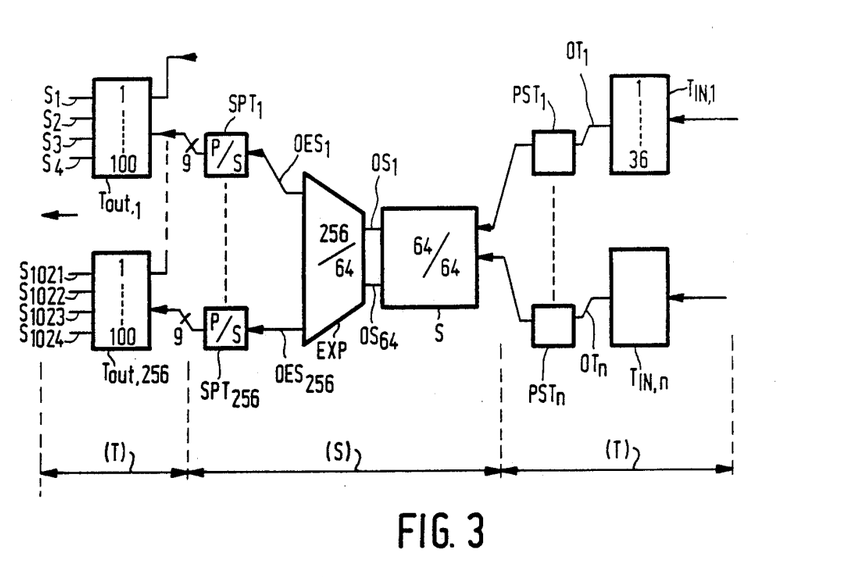
FIG. 3 shows a switching system of the time-space-time type according to the invention.

FIG. 3 shows a broadband switching system for 1024 subscribers terminals. The switching system has what is commonly referred to as a TST (time-space-time) configuration. The ingoing time switching stages $T_{in,i}$ are arranged for switching (i.e. exchanging time slots) of 36 channels of 34 Mbit/s (H4) each. For example 32 of these 36 channels are directly supplied with broadband signals (for example broadcast-TV), whilst the other four channels are utilized for the low bit rate channels H12 ( pronounce as H one two), B, D64 and D16.

Figure 4:
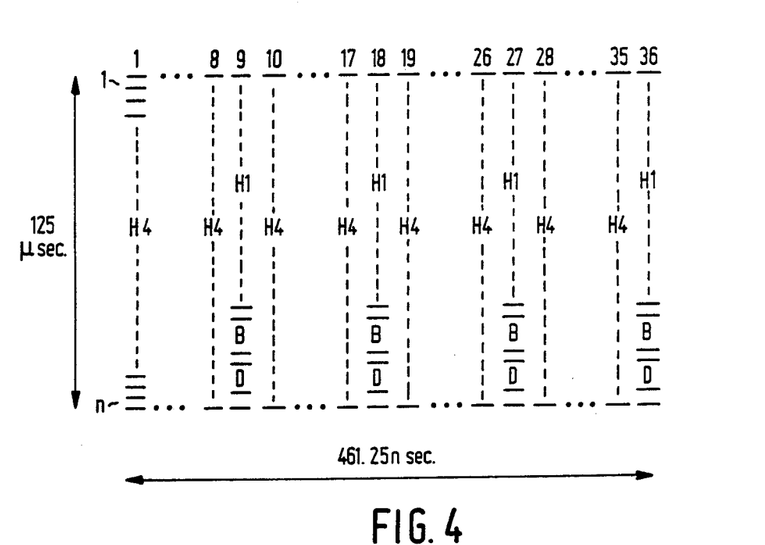
FIG. 4 shows the arrangement of a frame and a sub-frame of the time-division multiplex signal to be switched, according to the invention.

A time frame has 36 time slots, the frame length is 461.25 nsec. A superframe has 271 frames and a duration of 125 usec. Since 32 times slots are reserved in each frame for the H4 channels 1084 (4×271) time slots per superframe are available for the 125 usec. related channels such as H12, B, D64 and D16. These channels are distributed over the 1084 channels as required for example in a manner as shown in FIG. 4. The time slots 9, 18, 27 and 36 of each frame are thus reserved for the low bit rate channels, within each superframe a subdivision being made for one or a plurality of H12-/308-, B- and D-channels.

The further structure of one of the ingoing time switching stages $T_{in}$ will be described in detail with reference to FIG. 5.

The outgoing multiplex lines OT of the n time switching stages $T_{in}$ connected to a space switching system S (FIG. 3) using which the time slots on the incoming multiplex lines are switched through by the space switching network S to the desired outgoing multiplex line. The structure of the space switching network S will be described in detail with reference to FIG. 6.

The outgoing multiplex lines of the space switching network S are connected to the outgoing time switching stages $T_{out}$. In the example shows in FIG. 3 this is effected via an expansion network EXP (1 : 4). The time switching stages $T_{out}$ switch the incoming line slots to the desired subscribers, connected to the outputs $S_1$, $S_2$, ... $S_{1024}$ of the time switching stages $T_{out}$. In addition, inter alia the broadcast-TV channels are additionaly be connected to the time switching stages $T_{out}$, these channels being distributed by the time switching stages $T_{out}$ to the desired output. The details will be described with reference to FIG. 7.

Figure 5:
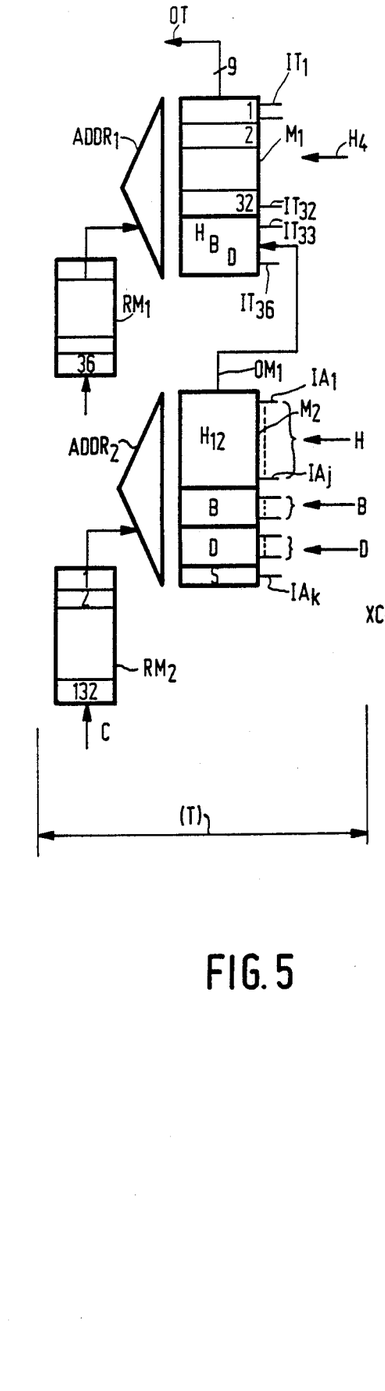
FIG. 5 shows an ingoing time switching stage according to the invention.

FIG. 5 shows an embodiment of one of the n ingoing time switching stages $T_{in}$ such as it is shown in FIG. 3. The time stage $T_{in}$ includes a first, high-bit rate time switching stage comprising an information store $M_1$ and controlled by an addressing arrangement $ADDR_1$ and a routing memory $RM_1$. Thirty-two channels of the H4 type are connected to the input $IT_1, \ldots IT_{32}$. These channels (34 mbits/s) are more specifically intended for video information (conference TV, TV-programmes having low audience figures, such as documentaries). The outputs $OM_1$ of an information store $M_2$ of a second, low-bit rate time switching stage are connected to the other four channels $IT_{33}, \ldots IT_{36}$ of the information store $M_1$. The information store $M_2$ is controlled by an addressing arrangement $ADDR_2$ and a routing memory $RM_2$. The second information store $M_2$ has inputs for a number of H12-, B- and D-channels. The exact number of these channels depends on the desired distribution between the number of H12- channels (1.92 Mbits/s), the number of 30B+D64 channels, the number of B-channels (2×64 kbits/s) and the number of D-channels (16×64 kbits/s). As was already remarked for FIG. 4, a superframe comprises 271 frames of 36 time slots each. Consequently, 271·(36−32)=1084 time slots are available per superframe for H12-, B-, D64- or D16-information channels.

The first, high rate time switching stage switches the information present in the (36) memory locations of the information store $M_1$ through to the desired time slot on one of the outgoing multiplex lines OT under the control of the information stored in the routing memory $RM_1$. Then, the routing memory $RM_1$ passes through all its (36) locations in one frame period (461.25 nsec.). The information stored in a given location of the routing memory $RM_1$ then determines the address of the location in the information store $M_1$.

The second, low bit rate time switching stage switches the information present in the memory locations of the information store $M_2$ through to an outgoing multiplex line $OM_1$ under the control of the information stored in the routing memory $RM_2$. Then the routing memory $RM_2$ passes through all its locations in one superframe period (125 usec.).

The channel originating from the time slots switched in the second time switching stage are applied to the four specific inputs $IT_{33}$–$IT_{36}$ of the first time switching stage $M_1$ and are switched through by this first time switching stage together with the other 32 H4-channels to the desired time slot in the outgoing multiplex line OT. The multiplex lines OT are each in the form of a bundle of parallel wires, one wire of the bundle being utilized for each bit of the word contained in one time slot. In the example descirbed here, 9-bit words are the starting point. Consequently, the multiplex lines OT will each comprise 9 parallel wires. The bit rate on the multiplex lines OT is approximately 78 Mbit/s; on the (four) internal multiplex lines $OM_1$ this rate is, however, only approximately 8.6 Mbit/s.

The multiplex lines OT are applied to the space switching network S via parallel-series converters $PST_1, ... PST_n$ (FIG. 3).

Figure 8:
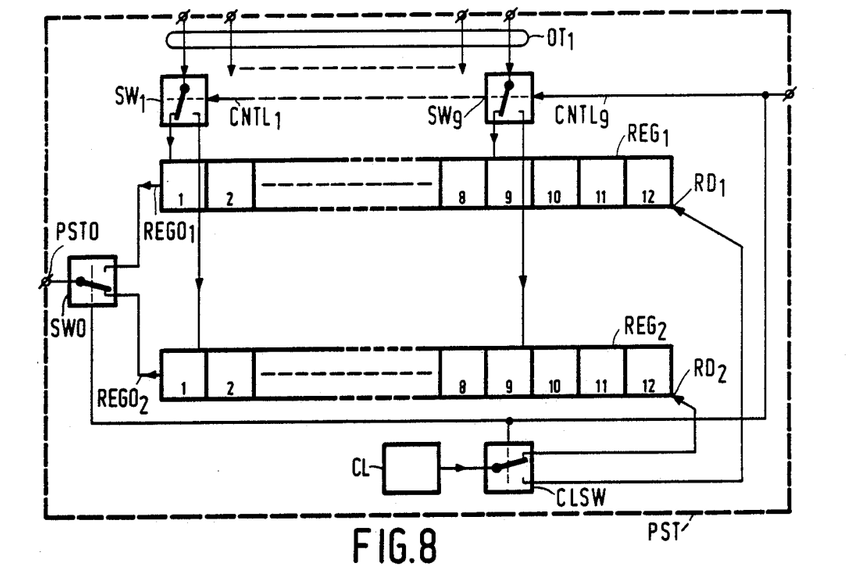
FIG. 8 is a block circuit diagram of a parallel-series converter for use in a switching system as shown in FIG. 3.

FIG. 8 shows an embodiment of a parallel-series converter suitable for this purpose. A multiplex line OT, for example $OT_1$, is connected to change-over switches $SW_1, SW_2, ... SW_9$, each individual wire of the nine parallel wires from which the multiplex line $OT_1$ is fomred, being conected to one of the switches SW. The parallel-series converter PST comprises two registers $REG_1$, $REG_2$, of, for example, 12 sections each. Inputs of the sections 1 to 9 of the first register, $REG_1$, are connected to the first change-over contact of the corresponding switches $SW_{1-9}$. Inputs of the sections 1 to 9 of the second register, $REG_2$, are connected to the second changeover contact of the corresponding switches $SW_{1-9}$. The changeover switches $SW_1, ... SW_9$ are controlled by control signals applied to control inputs $CNTL_1$, $CNTL_2$ of the change-over switches. The control signals may be identical for all of the change-over switches.

The parallel-series converter PST operates as follows. At the clock rate of the signals on the multiplex lines OT of the incoming time switching stage $T_{in,1}$ (approximately 78 Mbit/s) 9 bits always occur on inputs $OT_1$. In the shown position of the change-over switches $SW_1, ... SW_9$ these bits are written into the sections 1 to 9 of the first register $REG_1$. One clock period of the ingoing time switching stage later (the clock frequency corresponds to 78 Mbit/s) the switches $SW_1, ... SW_9$ are all adjusted to the other, second position (the position not shown) and the subsequent group of 9 parallel bits present on multiplex line $OT_1$ are written into the sections 1 to 9 of the second register $REG_2$. Alternately, at the rate and under the control of the clock derived from the ingoint time switching stage, 9 bits are written alternately into the first and second registers, $REG_1$ and $REG_2$, respectively.

Each register includes three further sections 10, 11 and 12. In these sections no signifcant information is written, these sections remain empty. An output of the first register, $REG_1$, is connected to a first change-over contact of output switch SWO, whilst an output of the second register $REG_2$ is connected to a second change-over contact of output switch SWO. The registers $REG_1$ and $REG_2$ are read with the aid of a clock generator CL which is connected, via a clock switch CLSW, to the read control inputs $RD_1$ and $RD_2$ of the respective registers $REG_1$ and $REG_2$. The clock frequency of clock generator CL corresponds to $12 \times 78$ Mbit/s=936 Mbit/s. In the shown position of the clock switch CLSW, this clock signal is applied to the second register $REG_2$. The twelve bits contained in the register $REG_2$ are serially applied from the output PSTO via the register output $REGO_2$ and switch SWO (the switch being in the position shown). After switching of the switches $SW_1, ... SW_9$, CLSW and SWO to the position now shown, the clock signal from clock generator CL is applied to the first register $REG_1$. The twelve bits contained in that register ($REG_1$) are serially supplied from the output PSTO via the register output $REGO_1$ and switch SWO (in the position now shown).

The bit stream at the output PSTO of the parallel-series converter PST (bit rate 936 Mbit/s) is applied to the space switching network S (FIG. 3). As each group of 9 significant bits is followed by a group of 3 "idle" bits the possiblity is created to switch this bit stream, which has an exceptionally high rate, in the space switching stage. Setting the cross-points can then namely always occur in the time interval in which the groups of idle bits would be transmitted (see below for the setting mode of the cross-points). Thus it was found to be possible to realize a space-time switching network suitable for 936 Mbit/s.

In the example described here, use is made of 3 "idle" bits on words having nine significant bits. The invention is however in no way limited to this choice of the two numbers of bits, nor to the ratio opted for between those numbers.

The space switching network S (FIG. 6) includes a square matrix MA of cross-point switches XPNT. In the embodiment 64 columns each having 44 cross-point switches are provided. The outgoing multiplex lines $OT_1, ... OT_{64}$ of the time switching stages $T_{in}$ are each connected to a row of switches XPNT of matrix MA. The cross-points associated with one specific column are controlled by a cross-point control $XC_1, XC_2, ... XC_{64}$. The cross-point control XC contains a first cross-point table memory $XFM_1$, a second cross-point table memory $XSM_1$ and a change-over switch $MS_1$. The fixed contact of change-over switch $MS_1$ is connected to the cross-points of the relevant column. The first movable contact of change-over switch $MS_1$ is connected to the first cross-point table memory $XFM_1$, whilst the second movable contact is connected to the second cross-point table memory $XSM_1$ via a buffer memory $BM_1$. The time slots from the (32) H4 channels are switched by the relevant column of the space switching system S under the control of the first cross-point table memory, whilst the other channels (H12, B, D64, D16) are swithced by the relevant column of the space switching system S under the control of the second cross-point table memory $XSM_1$. The cross-point to be closed by a suitable drive of switch $MS_1$ is determined on the basis of the read value originating either from the first cross-point table memory $XFM_1$ or the second cross-point table memory $XSM_1$. Just as for the time switching stages $T_{in}$, the rate at which the information is read from the first table $XFM_1$ (78 Mbit/s) is much higher than the rate at which the information is read from the second table (8.6 Mbit/s).

Figure 6:
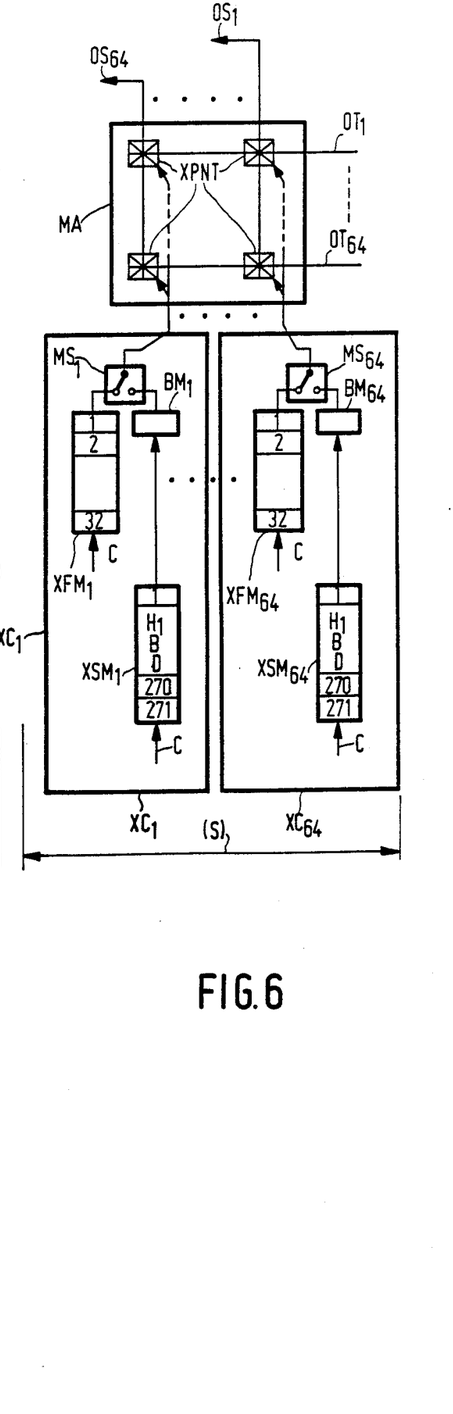
FIG. 6 shows a space switching stage according to the invention.

The time slots thus dynamically switched by the crosspoint controls $XC_1, XC_2, ... XC_{64}$ appear on the outgoing spacedivision multiplex lines $OS_1$, $OS_2$, ... $OS_{64}$.

Figure 9:
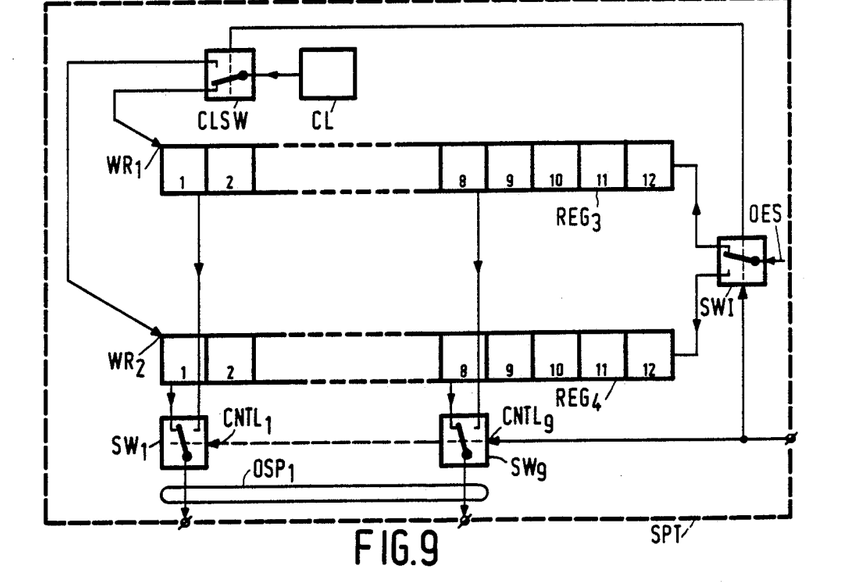
FIG. 9 shows a block circuit diagram of a series-parallel converter for use in a switching system as shown in FIG. 3.

The outgoing multiplex lines $OS_1$, ... $OS_{64}$ of the space switching network S (FIG. 3) are applied to an expansion network EXP. Using this network, which has an expansion factor of 1:4, the mutliplex lines $OES_1$, $OES_2$, ... $OES_{256}$ are applied to inputs of the (4×64=256) outgoing time switching stages $T_{out,1}$, $T_{out,2}$, ... $T_{out,256}$ via series-parallel converters $SPT_1$, $SPT_2$, ... $SPT_{256}$ included in the lines, An embodiment of a series-parallel converter SPT used therefor is shown in FIG. 9. The incombin multiplex line OES carrying signals having a bit frequency of 936 MBit/s is applied to an ingoing change-over switch SWI. In the shown position of the change-over switch a group of 12 bits is serially entered into register $REG_3$. Entering the bits is effected under the contorl of the clock generator CL (clock frequency corresponding to 936 Mbit/s) and clock switch CLSW in a similar way as described with reference to FIG. 8. During serially entering a group of 12 bits in register $REG_3$, the sections 1 to 9 of the second register $REG_4$ are written in parallel. To that end the sections 1 to 9 are connected to multiplex line $OSP_1$ via change-over switches $SW_1$, $SW_2$, ... $SW_9$. The multiplex line $OSP_1$ consists of 9 parallal wires. The switches $SW_1$, ... $SW_9$, SWI and CLSW are changed over, a 12-bit group is entered into register $REG_4$ and the 9 bits entered in the register $REG_3$ in the previous period are read. The groups of always three "idle" bits have fulfilled their task and are not conveyed by the series-parallel converter.

Figure 7:
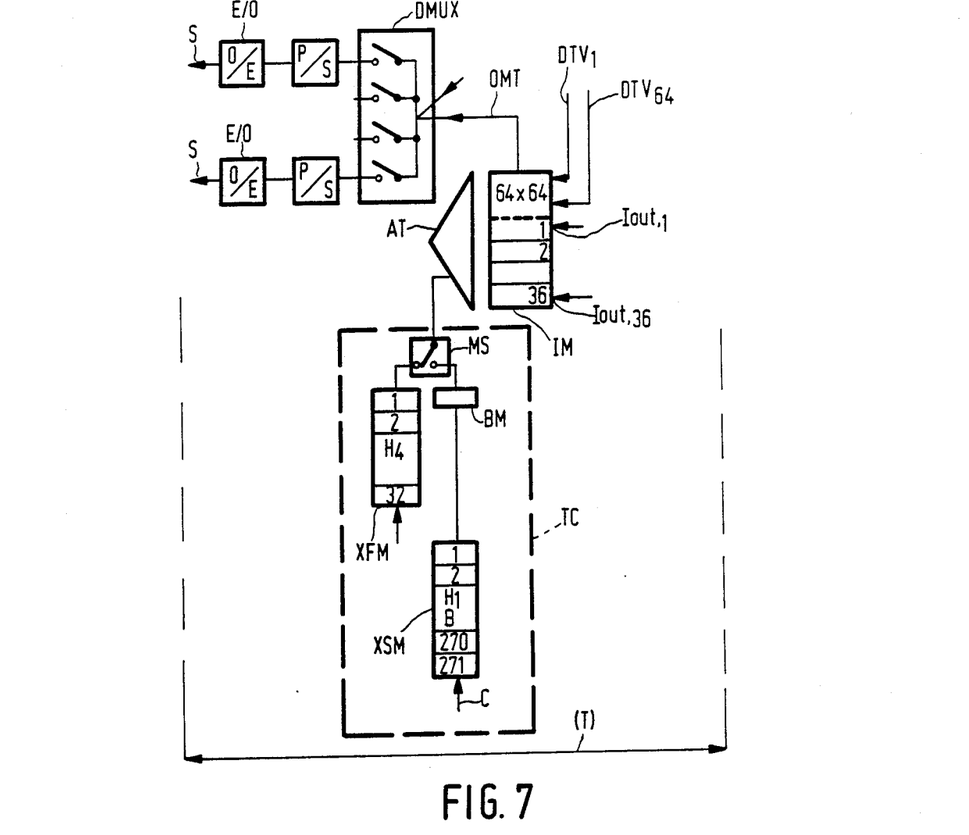
FIG. 7 shows an outgoing time switching stage according to the invention.

A time switching stage associated with the outgoing time switching network $T_{out}$ is shown in FIG. 7.

The time switching stage $T_{out}$ includes an information store IM having 36 inputs $I_{out,1}$, ... $I_{out,36}$ for the connection of 36 multiplex lines (OES, FIG. 3) originating from the space switching system S. In addition, the information store has a number of inputs $DTV_1$, $DTV_2$, ..., for example 64, for the connection of a like number of broadcast-TV sources. The inputs $DTV_1$, ... $DTV_{64}$ for the broadcast-TV sources of all the outgoing time switching stages $T_{out,1}$, ... $T_{out,256}$ are arranged parallel, as a result of which the possiblity of broadcast-TV signals of programs having a large audience figures being blocked can be reduced to zero. The information store IM is read under the control of a time slot control TC and an addressing arrangment AT. The time slot control TC is arranged in a manner comparable to the cross-point control XC which was described with reference to FIG. 6, consequently no further description will be provided. The information stored in the table memories XFM and XSM determine which 36 time slots (from the maximum number of (36+64) time slots present) will be read in each frame period and become available on output muliplex line OMT. The output multiplex line OMT is connected to a demultiplexer DMUX. Using this demultiplexer, the incoming signal is demultiplexed in four portions. Each of the four subscribers S, connected to one demultiplxer, receives 8 H4-channels and also 4 H12-channels and one 2B+D16-channel from the overall total of 32 H4-channels and a 4 mixed (H12, B, D) channels. This represents a bit rate on the subscriber's line of 9×36.688=312 Mbit/s.

I claim:

1. A broadband space switching network comprising a plurality of input lines, a plurality of output lines intersecting the input lines and a plurality of cross-point switches provided on each intersection of an input and an output line, the switches having a control input coupled to a cross-point control for selectively through-connected an input line to an output line, characterized in that a bit stream on the input lines and on the output lines is organized in nbit words, that each work contains $n_1$ ($n_1 < n$) information bits and ($n - n_1$) idle bits, that the cross-point switches always switch through the $n_1$ information bit word from an input line to an output line and that the cross-point switches are adjusted by the cross point control in the period in whcih the ($n - n_1$) idle bits are present on the input line.

2. A space switching network in claim 1, further including a parallel-series converter (PST) associated with each different one of said input lines, each converter (PST) having $n_1$ inputs and a single output connected to its respective associated input line, each parallel-series converter (PST) comprising a first register ($REG_1$) and a second register ($REG_2$) each having n sections, and a number ($n_1$) of change-over switches ($SW_1$, ..., $SW_9$), and an input of each switch ($SW_1$, ... $SW_9$) being connected to an input of the parallel-series converter, and a first change-over contact of each switch (SW) being connected to an input of $n_1$ sections of the first register ($REG_1$) and a second change-over contact of each switch being connected to an input of $n_1$ sections of the second register ($REG_2$) for alternately entering information into the first and second registers, and an output ($REGO_1$) of the first register ($REG_1$) being connected to a first change-over contact of an output switch (SWO) and an output ($REGO_2$) of the second register ($REG_2$) being connected to a second change-over contact of the output switch, the output switch (SWO) having a single output that constitutes the single output of said converter, and a control input of the two registers being coupled to a clock generator (CL) for alternately serially reaidng out the contents of the n sections of the second and first registers, via said output switch (SWO) to said single output of said converter.

3. A space switching network as in claim 1, further including a series-parallel converter (SPT) associated with each different one of said output lines, each converter (SPT) having a single input connected to its respective associated output line and $n_1$, outputs, each converter (SPT) comprising a first register ($REG_3$) and a second register ($REG_4$) each having n sections, and a number ($n_1$) of change-over switches ($SW_1$, ... $SW_9$), and an output of each switch ($SW_1$, ... $SW_9$) being connected to an output of the series-parallel converter, and a first change-over contact of each switch (SW) being connected to an output of the $n_1$ sections of the first register ($REG_3$) and a second change-over contact of each switch being connected to an output of $n_1$ sections of the second register ($REG_4$) for alternately and in parallel reading out the contents of $n_1$ sections of the first ($REG_3$) and the second registers ($REG_4$), and an input of the first register ($REG_3$) being connected to a first change-over contact of an input switch (SWI) and an input of the second register ($REG_4$) being connected to a second change-over contact of said input switch (SWI) and a control input (WR) of the two registers being coupled to a clock generator (CL) for alternately and serially writing the first ($REG_3$) and the second registers ($REG_4$) each with n bits received fromm said output line via said input switch (SWI).

* * * * *

UNITED STATES PATENT AND TRADEMARK OFFICE
CERTIFICATE OF CORRECTION

PATENT NO. : 4,796,254

DATED : January 3, 1989

INVENTOR(S) : Johannes van Baardwijk and Dick van der Steen

It is certified that error appears in the above-identified patent and that said Letters Patent is hereby corrected as shown below:

In column 1, line 47, "hole" should read --holes--. Column 2, line 14, "input" should read --output--. Column 2, line 67, "such" should read --much--. Column 3, line 49, "30B+D64" should read --30.B+D64--. Column 4, line 8, "/308-," should read --/30B-,--. Column 4, line 24, "incoming line" should read --incoming time--. Column 4, line 27, "channels are" should read --channels can--. Column 5, line 8, "channel" should read --channels--. Column 5, line 58, "ingoint" should read --ingoing--. Column 6, line 37, "44 cross point" should read --64 cross-point--. Column 7, line 12, "incombin" should read --incoming--. Column 7, line 63, "36.688" should read --34.688--.

In column 8, line 4, "through-connected" should read --through-connecting--. Column 8, line 6, "work contains" should read --word contains--. Column 8, line 11, "whcih" should read --which--. Column 8, line read --network as in--.

Signed and Sealed this

Twenty-sixth Day of September, 1989

*Attest:*

DONALD J. QUIGG

*Attesting Officer*      *Commissioner of Patents and Trademarks*